(12) United States Patent
Cotignola et al.

(10) Patent No.: US 8,798,243 B2
(45) Date of Patent: Aug. 5, 2014

(54) CUSTOMER PREMISES EQUIPMENT TELEPHONE DEVICE PROVIDING ADVANCED MEDIA FEATURES

(75) Inventors: Christopher J. Cotignola, Doylestown, PA (US); Jacob Igval, Newtown, PA (US); Dipak R. Patel, Hatboro, PA (US)

(73) Assignee: Motorola Mobility LLC, Chicago, IL (US)

( * ) Notice: Subject to any disclaimer, the term of this patent is extended or adjusted under 35 U.S.C. 154(b) by 1215 days.

(21) Appl. No.: 12/625,918

(22) Filed: Nov. 25, 2009

(65) Prior Publication Data

US 2011/0123007 A1    May 26, 2011

(51) Int. Cl.
*H04M 11/00*    (2006.01)
(52) U.S. Cl.
USPC ..................... 379/93.01; 379/88.13
(58) Field of Classification Search
USPC ................. 379/90.01, 93.01, 142.01, 207.16, 379/88.13; 340/10.1
See application file for complete search history.

(56) References Cited

U.S. PATENT DOCUMENTS

| | | | |
|---|---|---|---|
| 4,431,875 A * | 2/1984 | Simokat | 379/27.01 |
| 5,915,026 A * | 6/1999 | Mankovitz | 713/168 |
| 6,711,239 B1 | 3/2004 | Borland | |
| 2003/0063478 A1 * | 4/2003 | Beranger et al. | 363/21.07 |
| 2005/0180554 A1 | 8/2005 | Alston et al. | |
| 2006/0084471 A1 | 4/2006 | Walter | |
| 2007/0133760 A1 | 6/2007 | Cotignola et al. | |
| 2007/0133785 A1 | 6/2007 | Cotignola et al. | |
| 2007/0206776 A1 | 9/2007 | Patel et al. | |
| 2008/0267334 A1 | 10/2008 | Patel et al. | |
| 2008/0268879 A1 | 10/2008 | Cotignola et al. | |
| 2008/0317225 A1 | 12/2008 | Cotignola et al. | |
| 2009/0109969 A1 | 4/2009 | Cotignola et al. | |
| 2009/0154670 A1 * | 6/2009 | Cotignola et al. | 379/93.01 |
| 2010/0067671 A1 * | 3/2010 | Cotignola et al. | 379/93.09 |
| 2012/0162421 A1 * | 6/2012 | Iwamura | 348/143 |

* cited by examiner

*Primary Examiner* — Simon Sing
*Assistant Examiner* — Solomon Bezuayehu
(74) *Attorney, Agent, or Firm* — Leydig, Voit & Mayer, Ltd.

(57) ABSTRACT

A customer premises equipment (CPE) device, such as a telephone, connected to a local communications line existing on the premises is capable of receiving incoming telephone or like communication calls. The device has an interface which connects the device to the local communications line on the premises and enables the device to receive an alternating voltage analog ring signal corresponding to a notification of an incoming telephone call. The device also includes a demodulator for decoding and processing the ring signal including additional media data which is of low amplitude relative to that of the alternating voltage analog ring signal and which is modulated on the alternating voltage analog ring signal. Further, the device includes an input/output (I/O) component providing a means for audible and/or visual output of media from the device. The media output from the device directly corresponds to the media data modulated on the ring signal. CPE telephone systems and methods are also provided.

20 Claims, 6 Drawing Sheets

CUSTOMER PREMISES EQUIPMENT TELEPHONE DEVICE PROVIDING ADVANCED MEDIA FEATURES

FIELD

Customer premises equipment providing telephone service via traditional analog RJ-11 twisted pair lines, wiring, jacks and devices is disclosed, and more particularly, a system and method providing telephone devices that are connected to analog RJ-11 twisted pair telephone lines and that provide advanced features and functionality.

BACKGROUND

It is common for Customer Premises Equipment (CPE) at a residential site, home, home office, small office, apartment, building, or like premises, to have a telephone system utilizing analog RJ-11 twisted pair telephone lines, wiring, jacks and devices that comply with conventional analog ring signal transmission requirements; e.g., traditional Bellcore/Telcordia analog transmission requirements specifically designed to work on Plain Old Telephone Service (POTS) telephone systems. Such a CPE telephone system traditionally has been connected to a circuit-switched landline phone network for purposes of receiving telephone service and has provided CPE telephones with little to no advanced media features which have otherwise become commonplace in connection with the use of cellular/mobile telephones operating on wireless digital networks.

Analog RJ-11 twisted pair telephone wiring, lines and devices provide significantly limited functionally when compared, for instance, to the functionality of cellular or mobile phones operating on wireless digital networks. By way of example, mobile phones and like handsets commonly offer advanced media features including the ability to receive and display graphics, still images and video, to play audio such as user-selected music ring tones and the like, and to display other data or information in connection with receiving an incoming call or otherwise. In contrast, CPE telephone devices on analog RJ-11 twisted pair lines do not offer such features.

In recent years, it has become more common for CPE to include a modem, such as a DOCSIS cable modem or DSL modem, connected to an Internet service provider's network to provide the customer with Internet access via the modem. With the advent of Voice-over-Internet-Protocol (VoIP), DOCSIS cable modems and DSL modems can be used, not only for purposes of providing high-speed Internet access to a customer, but also to provide telephone service for the premises. For this specific purpose, the CPE can include a media terminal adapter (MTA) or the like to provide the VoIP service.

The MTA interfaces with an IP network, for example, via the above referenced modem, and is operable to adapt VoIP data for use by other customer premises equipment, such as a telephone system including, for instance, one or more separate base units and/or a set of handsets that may be distributed about the premises. The MTA can be used for purposes of delivering all basic phone services to the customer such as handling voice compression, packetization, security, and call signaling and support older phone handsets and fax machines. A typical MTA will include a Subscriber Line Interface Card (SLIC) that enables the MTA to drive the analog telephone lines or local telephone wiring loop existing throughout the premises.

As a further option, the CPE can include the MTA embedded within (i.e., built directly into) a DOCSIS cable or DSL modem to bundle Internet and VoIP services via installation of a single device. Such a combination is often referred to as an eMTA (embedded Media Terminal Adapter). The MTA and modem components of an eMTA are typically assigned separate Media Access Control (MAC) and IP addresses, and the eMTA includes jacks such as analog RJ-11 twisted pair jacks for connection to RJ-11 twisted pair telephone line wiring provided or looped throughout the premises to which CPE telephone devices can be connected.

The MTA or eMTA can deliver basic features, functionality, and ringing capabilities to the CPE telephone devices connected to the RJ-11 wiring. With respect to ringing capabilities, for example, the MTA or eMTA generates an alternating voltage ring signal between the so-called tip and ring wires on the RJ-11 twisted pair and causes the CPE telephone devices to activate its ringer in a generic manner to provide an alert of an incoming call. The cadence and timing of ringing can be altered by the MTA or eMTA by the generation of a ring signal with different duty cycles (i.e. "on" and "off" timing) and cadence. However, this merely changes the pattern of the ring and the ring is still generic.

Essentially, the requirements of using existing analog RJ-11 twisted pair lines, traditional telephone ring signal transmissions, and legacy telephones at the customer premises provide a limitation for VoIP service to offer telephone features similar to that offered by the cellular/mobile phone market operating on digital networks.

SUMMARY

A customer premises equipment (CPE) device, such as a telephone, connected to a local communications line existing on the premises and capable of receiving incoming telephone or like communication calls is provided. The device has an interface which connects the device to the local communications line on the premises and enables the device to receive an alternating voltage analog ring signal corresponding to a notification of an incoming telephone call. The device also includes a demodulator for decoding and processing the ring signal including additional media data which is of low amplitude relative to that of the alternating voltage analog ring signal and which is modulated on the alternating voltage analog ring signal. Further, the device includes an input/output (I/O) component providing a means for audible and/or visual output of media from the device. The media output from the device corresponds to the media data modulated on the ring signal.

According to some contemplated embodiments, the I/O component can include an audio player and a speaker and the additional media data decoded and processed by the demodulator provides a customized ring tone or audio clip for being emitted by the speaker to provide a customized audible notification of an incoming call. As another possibility, the I/O component includes a display screen and the additional media data decoded and processed by the demodulator provides a graphic image or streaming video to be displayed on the display screen to provide a visual notification concerning the incoming call. The local line to which the interface of the CPE device can connect includes tip and ring twisted pair RJ-11 wiring such that the alternating voltage analog ring signal with additional low amplitude media data modulated thereon is received by the CPE device via the RJ-11 wiring. Thus, despite the RJ-11 wiring and compliance with traditional Bellcore/Telcordia analog transmission requirements, the CPE device provides features and functionality comparable to mobile phones operating on purely digital wireless networks.

According to another aspect, a customer premises equipment (CPE) telephone system capable of receiving incoming telephone calls via an outside service provider network is provided. The system includes a customer premises equipment (CPE) network-interface device connected to the outside service provider network. The network-interface device has a processor for detecting an incoming call from the service provider network and for generating media data corresponding to the incoming call. The network-interface device also has a digital signal processing (DSP) circuit using an analog modulation technique to modulate the media data of low amplitude on an alternating voltage analog ring signal of relatively greater amplitude. The system also includes customer premises wiring comprising tip and ring twisted pair RJ-11 wiring connected to the CPE network-interface device and to a customer premises equipment (CPE) telephone device such that the CPE telephone device receives the ring signal having media data modulated thereon. The CPE telephone device has a demodulator for decoding and processing the low amplitude media data modulated on the ring signal and an input/output (I/O) device providing audible or visual output of media based on information provided by the media data decoded by the demodulator.

According to yet a further aspect, a method for providing additional media features and functionality to a customer premises equipment (CPE) telephone device connected via RJ-11 twisted pair wiring to a customer premises equipment (CPE) network-interface device which is connected to an outside service provider network is provided. The method includes the step of receiving an incoming call on the CPE network-interface device via the outside service provider network and generating and transmitting on the RJ-11 twisted pair wiring an alternating voltage analog ring signal having media data modulated thereon by the CPE network-interface device. The method also includes the steps of decoding the ring signal with media data modulated thereon with a demodulator of the CPE telephone device and providing audible or visual output of media via an input/output (I/O) device of the CPE telephone device based on information provided by the media data decoded by the demodulator.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Further, some descriptions are provided herein relative to the presence and use of a MTA or eMTA at the customer premises connected to a VoIP service provider network. It should be understood that the physical location of the MTA or eMTA does not necessarily need to be on the premises and that the MTA or eMTA are merely provided as examples of network-interface devices that interconnect communication wiring located at a premises with an outside service provider network. Also, it should be understood that the described telephone system can also be incorporated into CPE connected to a circuit-switched landline phone network or another type of network instead of a VoIP network. Thus, the use of a MTA or eMTA and a VoIP service provider network are merely described for purposes of example.

Figure 1:
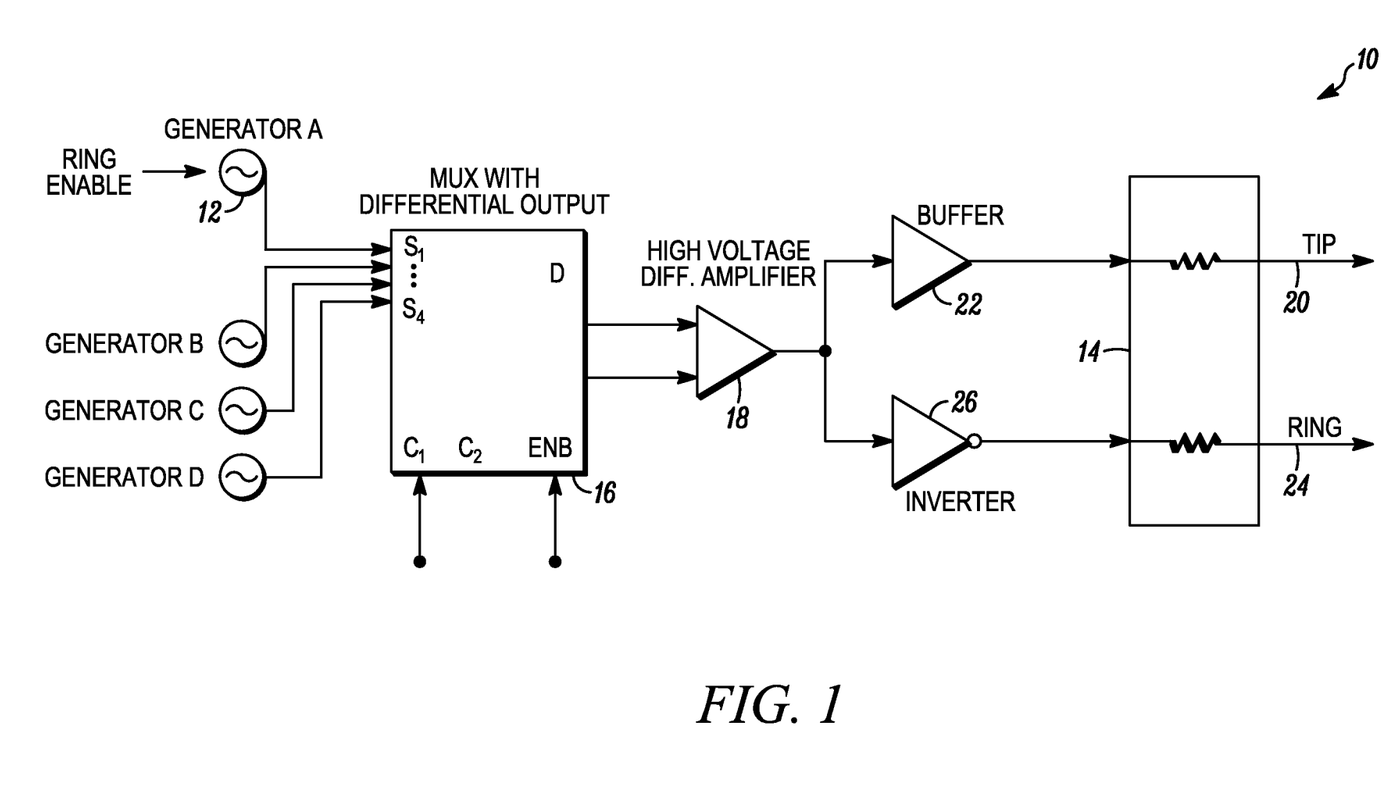
FIG. 1 is a schematic view illustrating a ring signal flow diagram of a MTA or eMTA not providing advanced media features according to an embodiment.

For purposes solely for comparison, an example of a ring signal flow system 10 that does not enable advanced media features and functionality is shown in FIG. 1. In this example, a MTA or eMTA at the customer premise receives an incoming call from a VoIP service provider network and generates and transmits a ring signal to a CPE telephone device over analog RJ-11 twisted pair wiring. The MTA or eMTA has a set 12 of signal generators used, for instance, to generate a generic alternating voltage ring signal, Dual Tone Multi Frequency (DTMF) tones (i.e., to enable touch tone dialing), Caller Identification (CID) signals, Frequency Shift Key (FSK) tones, and the like. The signals output from the generators 12 are multiplexed (i.e. muxed) and simultaneously transmitted from the MTA or eMTA to the CPE telephone device (not shown) via a tip/ring pair 14 of an analog RJ-11 twisted pair wiring. For example, the analog signals output by the generators 12 are directed to a mux 16 (i.e. multiplexer) and then to an amplifier 18, such as a high voltage differential amplifier. The amplified signal is then applied to the tip 20 of the tip/ring pair 14 via a buffer 22 and the ring 24 of the tip/ring pair 14 via an inverter 26. The CPE telephone device is connected to the other end or a local loop of the RJ-11 twisted pair wiring and receives the signal.

A significant limitation of the ring signal transmission described above is that, if additional data is to be transmitted to the CPE telephone device during an incoming call event, the additional data can only be transmitted to the CPE telephone device during the ring "off" period and cannot be transmitted during the ring "on" period. Thus, data, such as generated by the FSK signal generator, can be sent to the CPE telephone device only during the ring "off" period of the ring signal. The ring "off" period between audible rings can be of fairly short duration, such as two or three seconds, depending upon ring pattern. Thus, only a limited amount of data, such as caller ID information, can be sent over a traditional analog RJ-11 twisted pair telephone line during the ring "off" period.

More advanced media features requiring greater or uninterrupted data transmission to a CPE telephone device are not possible with the signal flow system 10 shown in FIG. 1.

Figure 2:
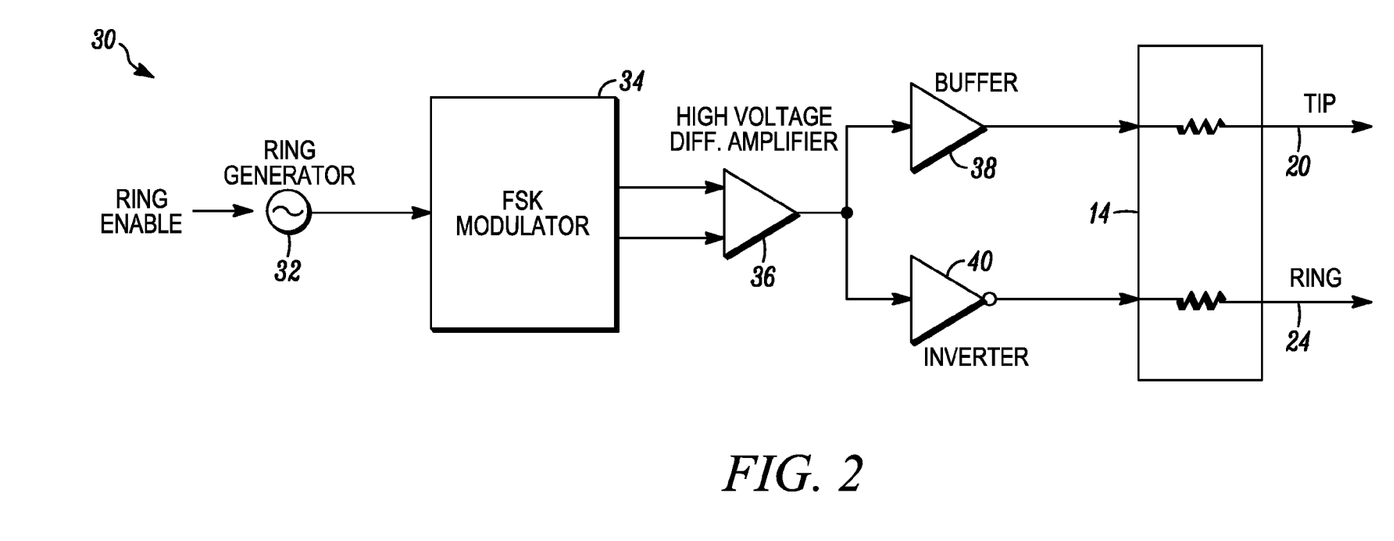
FIG. 2 is a schematic view illustrating a ring signal flow of a MTA or eMTA providing advanced media features according to an embodiment.

In comparison, FIG. 2 illustrates a ring signal flow system 30 that overcomes the above referenced drawbacks and that is able to provide advanced media and calling features and functionality. These features may include customization of ring tone such as by way of playing audio clips via use of MP3 files, polymorphic ring tones, and the like. In addition, multimedia such as an image, picture or streaming video can be sent with the ring signal to the CPE telephone device for display of the image, picture or video on a display screen of the CPE telephone device. For instance, a photograph of the caller placing the incoming call can be displayed on the display screen of the CPE telephone device so that the caller's identity can be visually appreciated before the incoming call needs to be answered.

The above can be accomplished by data transmission from the MTA or eMTA to a tip/ring pair 14 of traditional RJ-11 twisted pair wiring provided by modulating a traditional ring signal with additional media data generated by the MTA or eMTA. The modulation can be accomplished via a FSK modulator or any other means or modulator enabling the ring signal to be modulated with the media data. The media data should be of relatively low amplitude as compared to that of the ring signal. This is because the transmission should not interfere with proper operation of conventional or so-called "legacy" CPE telephone devices that are not able to provide the advanced features. Thus, the Bellcore/Telcordia specifications for providing telephone service on RJ-11 twisted pair wiring, such as via tip and ring voltages, are not violated by the system 30 shown in FIG. 2.

Referring to FIG. 2, a ring signal is applied from a ring signal generator 32 to a modulator 34, such as a FSK modulator. The modulator 34 is also provided with additional signals, such as via a processor or the like, with respect to other information such as media data to be modulated on top of the ring signal. This information, for instance, can relate to data, graphics, text, audio clips, streaming video, or any other type of information permitting the CPE telephone device to provide advanced media features or mobile phone-like functionality. As before, the modulated analog ring signal is applied to an amplifier 36, such as a high voltage differential amplifier, and then to the tip 20 of the tip/ring pair 14 via a buffer 38 and the ring 24 of the tip/ring pair 14 via an inverter 40.

Figure 3:
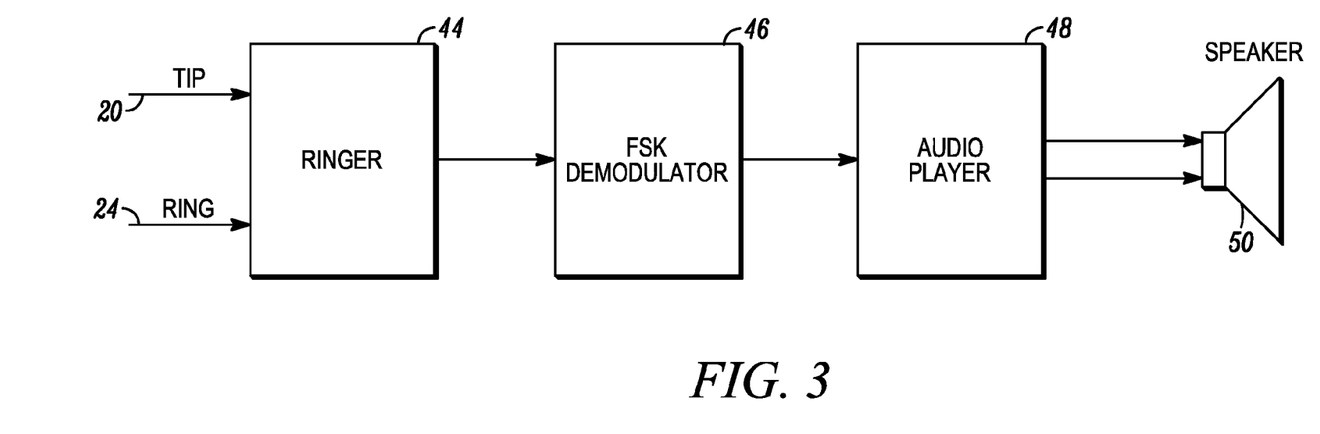
FIG. 3 is a schematic view of a ring signal flow diagram of a CPE telephone device providing advanced media features according to an embodiment.

FIG. 3 illustrates a flow diagram of a novel modified CPE telephone device 42 used to receive and decode the above referenced modulated ring signal. The device 42 can be, for instance, a hard-wired telephone, a base unit for a cordless telephone, a portable telephone handset, or the like or any combination thereof. The device 42 is able to provide enhanced media features despite receiving traditional analog ring signals over RJ-11 twisted pair wiring. The tip 20 and ring 24 of the tip/ring pair 14 are connected to a ringer 44 of the device 42 which can provide the modulated signal to a demodulator 46, such as an FSK demodulator or other type of demodulator. The demodulator 46 decodes the low amplitude media data carried on the traditional ring signal and processes it to provide the desired feature. For example, desired text, a graphic image or picture, or a streaming video could be displayed on a screen of the CPE telephone device 42 or a particular polymorphic, MP3 or like sound clip can be emitted by an audio player 48 via a speaker 50. In this way, the device 42 can provide customized notification of an incoming call and can be provided with additional information concerning the call or the identity of the caller.

As discussed above, the low amplitude media data is modulated on top of the ring signal and is transmitted and received simultaneously with the ring signal during the ring "on" period of the ring signal. It also can be transmitted and received by the CPE telephone device 42 during a ring "off" period of the ring signal. Thus, a longer and continuous stream of data can be transmitted and received without the need to break up or interrupt the data stream due to ring "on" and "off" periods of the ring signal.

Further, standard or existing CPE telephone devices (hereinafter referred to as legacy CPE telephone devices), such as telephone bases or handsets that do not have the above referenced demodulator, will function in a proper manner when they receive the above referenced modulated ring signal. The low amplitude media data modulated on the ring signal will appear to be nothing more than a small amount of noise to such a legacy device in an amount acceptable by the legacy device for proper operation. Thus, the low amplitude media data modulated on the ring signal will not impact the basic characteristics of the ring signal, including its amplitude, stored energy, frequency, and rise/fall time of the signal. This permits a customer to upgrade to a new enhanced feature CPE telephone device at some locations on the premises and to continue to use legacy CPE telephone devices at other locations, all of which are able to co-exist and function properly.

Figure 4:
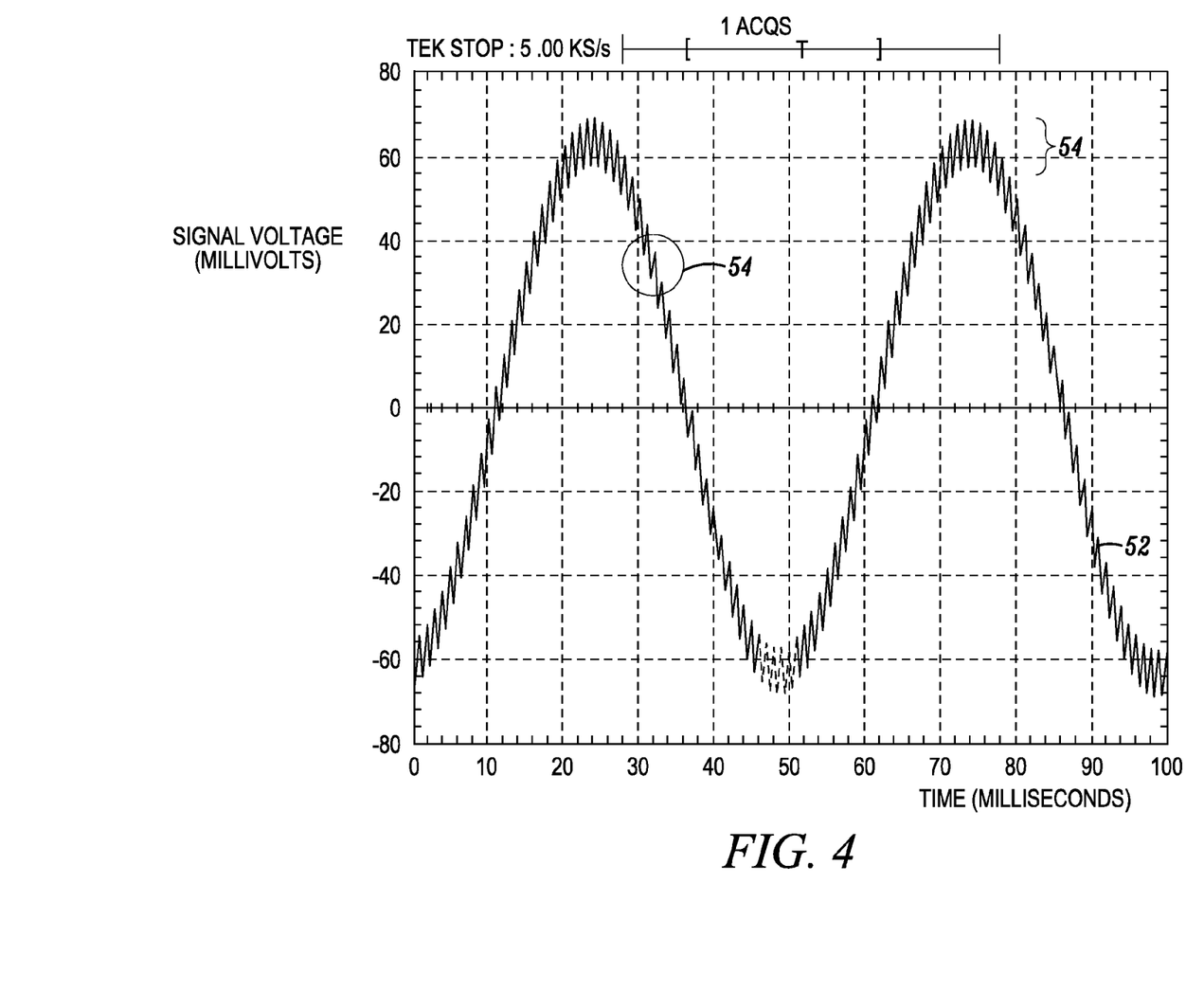
FIG. 4 illustrates a ring signal having low amplitude media data modulated thereon according to an embodiment.

An example of a ring signal 52 with low amplitude media data 54 modulated on the ring signal 52, such as via FSK modulation, is shown in FIG. 4. As stated above, the basic characteristics of the ring signal 52 is essentially the same with or without modulation. Thus, a legacy CPE telephone device will function properly as if the ring signal 52 did not carry the low amplitude data 54 modulation. The modulation is considered noise and is ignored and the legacy CPE telephone device functions normally. In contrast, a so-called "enhanced" CPE telephone device 42 having a demodulator 46 and the architecture shown in FIG. 3 will decode the modulation of low amplitude media data 54 and will cause the "enhanced" CPE telephone device 42 to provide one or more desired media features.

By way of example, the low amplitude data 54 can provide data of a still picture or video stream in connection with an incoming call being received by the MTA or eMTA. For example, a picture of the person placing the call at the other end of the call can be displayed on the enhanced CPE telephone device 42 so that the identity of the caller can be obtained by the viewing the picture or video clip. Alternatives can include text or other types of graphics relating to caller identification type features. The low amplitude data 54 can also be used to provide a particular sound clip to be emitted from the enhanced CPE telephone device. For example, user selected music or sound clips or other sounds (similar to those emitted by mobile phones) can be emitted from the enhanced CPE telephone device 42 instead of the traditional bell-like ring or buzzer. Also, when the telephone is not receiving a call (i.e., no ring signal is being generated), a data signal can be caused to be transmitted to the enhanced CPE telephone device 42 to display advertisements, alerts, status, news, weather, or other information of importance on the screen of the enhanced CPE telephone device 42.

Figure 5:
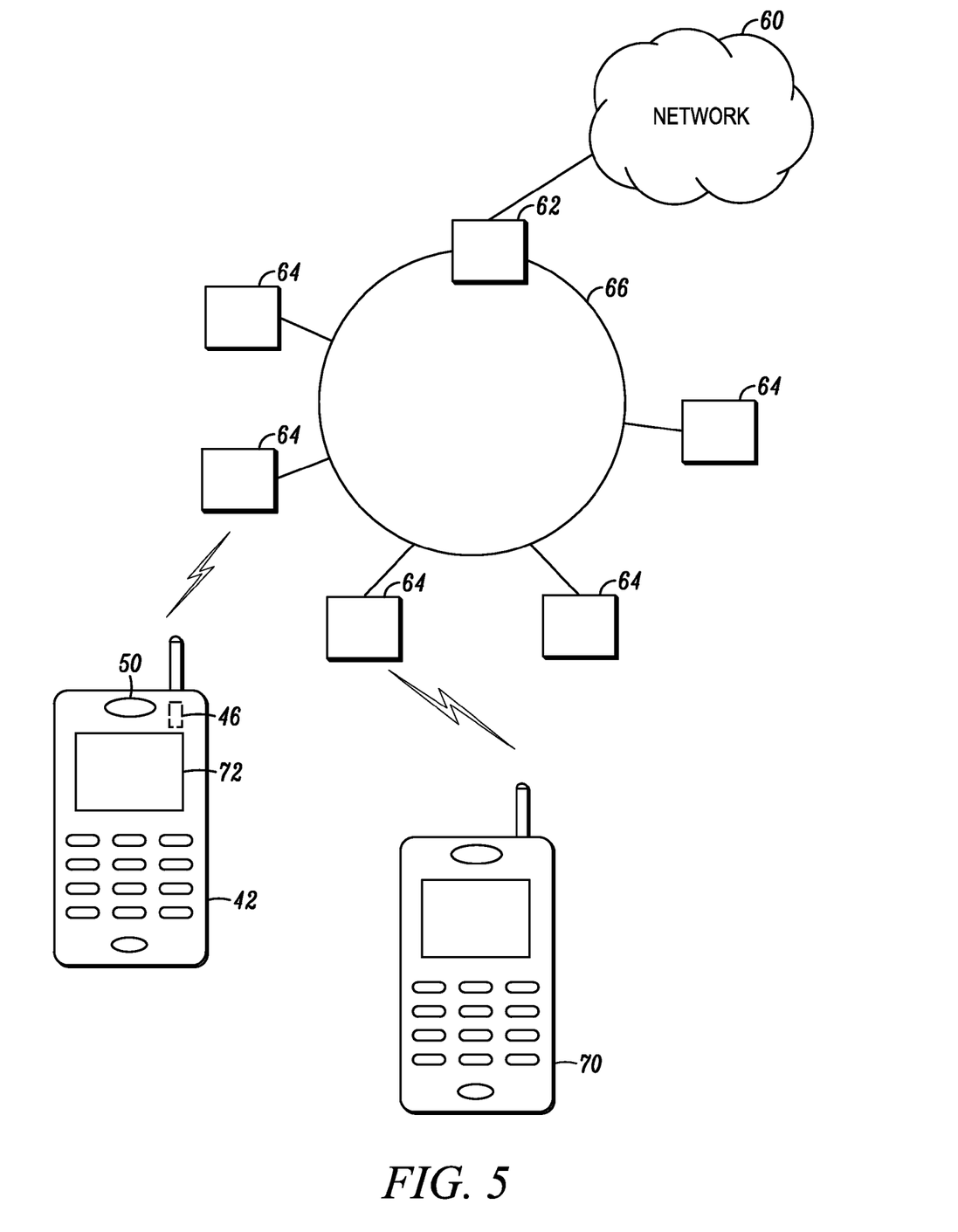
FIG. 5 is a schematic view of an overall telephone system according to an embodiment.

The following example of "events" of a contemplated embodiment of a CPE telephone system are discussed below. As best illustrated in FIG. 5, a service provider network 60 is connected to a MTA, eMTA or like CPE 62 at a particular customer's premises. The network 60 can include an IP network providing one or more digital communication services, such as VoIP, high speed Internet connection, cable television, satellite service, or like service. Alternatively, the network 60 can include a circuit-switched POTS network.

CPE devices 64 on the premises are connected to a local line or loop 66 extending from the MTA or eMTA 62. The loop 66 may be of conventional twisted pair loop wiring of RJ-11, and the CPE devices 64 may include hard-wired telephones, telephone base stations with cordless handsets, home security systems, answering machines, facsimile machines, computers and other devices which may be connected to loop 66. For purposes of this example, the devices 64 at least include an "enhanced" CPE telephone device 42 including a demodulator 46 discussed above and a so-called "legacy" CPE telephone device 70 (i.e., without a demodulator) both connected to the same telephone line or loop 66 via RJ-11 twisted pair wiring and/or jacks. The enhanced CPE telephone device 42 is able to decode the modulated signal as discussed above, whereas, the legacy CPE telephone device 70 simply ignores the low amplitude media data as an acceptable amount of noise on an otherwise normal ring signal.

Figure 6:
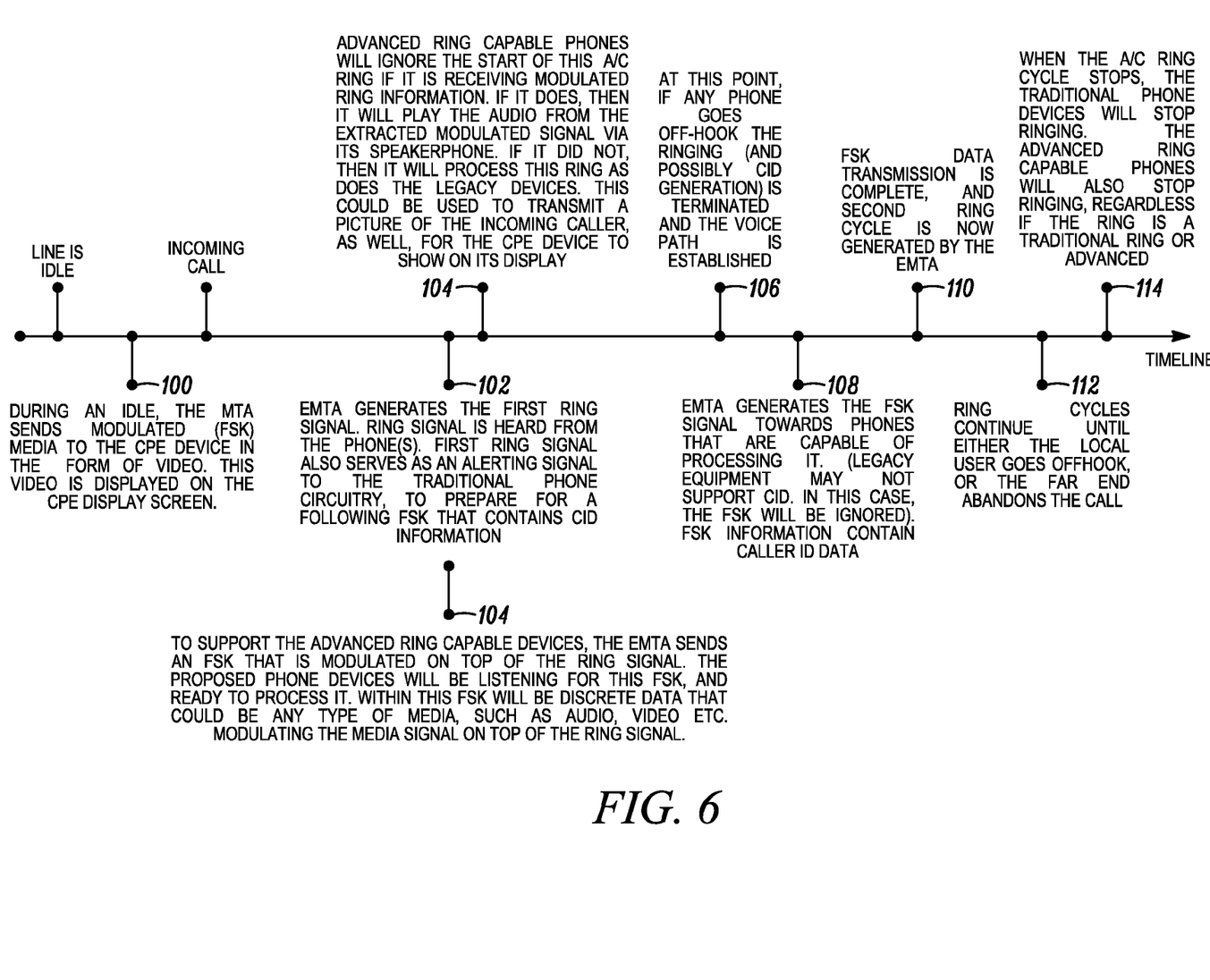
FIG. 6 is a diagram showing events of a telephone system relating to the receipt of an incoming call according to an embodiment.

When the line is idle, the MTA or eMTA 62 can be directed to send a media signal to the CPE telephone devices 64. See event 100 in FIG. 6. The media can provide a video for being displayed on a screen 72 of the enhanced CPE telephone device 42. This transmission can be "silent" or otherwise not be of a type that confuses a customer into thinking an incoming call is being received. The enhanced CPE telephone device 42 decodes the signal and displays the video advertisement or the like. However, the legacy CPE telephone device 70 simply ignores the media signal and remains idle.

When an incoming call is received, the MTA or eMTA 62 generates a ring signal. See event 102 in FIG. 6. As a result, a first "ring" is produced by all CPE telephone devices. This first "ring" also serves as an alert to the CPE devices 64 to prepare for a multiplexed FSK signal during the "off" ring period providing traditional caller ID information. In addition, the MTA or eMTA 62 will send an FSK modulation on top of the ring signal and the enhanced CPE telephone device 42 will decode and process the low amplitude data media modulated on the standard ring signal. See event 104 in FIG. 6. This could result in a particular tune, sound clip, or the like being emitted by the speaker 50 of the enhanced CPE telephone device 42 or could include video or a picture for display on the screen 72 of the enhanced CPE telephone device 42 (i.e., such as a picture of the caller). Of course, the legacy CPE telephone device 70 simply ignores the low amplitude media data modulated on the ring signal as an acceptable level of noise.

After the initiation of the first ring, a voice path is established and ringing and receipt of other data, such as caller ID information, is terminated should any of the CPE telephone devices 64 go "off-hook". See event 106 in FIG. 6. If an "off-hook" condition is not realized by the end of the first ring, a first "off" ring period is provided. During this period, the MTA or eMTA 62 generates an FSK signal providing caller ID information. See event 108 in FIG. 6. This information is displayed on the CPE telephone devices 42 and 70, assuming the legacy CPE telephone device 70 has such a capability. After this information is transmitted and received and should a phone not go "off-hook", a second ring signal cycle is generated by the MTA or eMTA 62. See event 110 in FIG. 6. These ring cycles continue until either one of the local CPE telephone devices go "off-hook" in an effort to answer the incoming call or until the far end abandons an unanswered call. See event 112 in FIG. 6. The ring cycles also stop should the call be forwarded and answered by an automated voice mail system. At this point, both the advanced and legacy CPE telephone devices 42 and 70 stop ringing. See event 114 in FIG. 6.

At any point while the MTA or eMTA 62 transmits a signal to the CPE telephone devices 64, the MTA or eMTA 62 can modulate a low amplitude media signal on the ring signal or other signal being transmitted. Thus, data can continually be provided to the enhanced CPE telephone device 42 throughout the length of the ring signal cycles and relatively large amounts of information or data can be transmitted and decoded, and the resulting media outputs can be accomplished.

Figure 7:
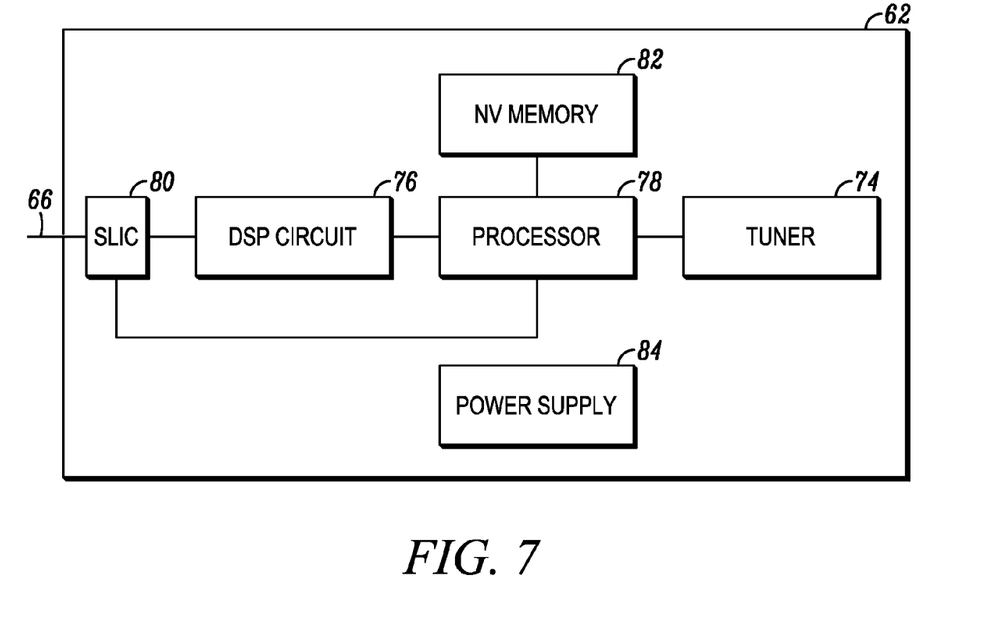
FIG. 7 is a block diagram showing the architecture of an eMTA according to an embodiment.

By way of example, FIG. 7 illustrates a block diagram of an eMTA 62 configured to generate and transmit a modulated ring signal as discussed above. The eMTA 62 may include a tuner 74, a digital signal processing (DSP) circuit 76, a processor 78, a subscriber line integrated circuit (SLIC) 80, nonvolatile memory 82, and power supply 84. The eMTA 62 may include other features not shown but known in the art. The eMTA 62, for example, receives digital data sent via the network 60 shown in FIG. 5 and demodulates and formats the data for transmission on the loop line 66 for use by the CPE devices 64.

The SLIC 80 emulates the functions of a telephony central office, as is known in the art, for providing VoIP services. The SLIC 80 generates the tip and ring voltages, i.e., the first ring signal and subsequent ring signals in ring cycles, on the loop 66. When an incoming call is received at the eMTA 62, the processor 78 generates discrete media data for transmission as an advanced media feature signal on the loop 66. The discrete media data includes instructions for the CPE device 42 to perform an advanced media feature. The DSP circuit 76 and the SLIC 80 modulate the discrete media data for transmission on the loop 66. This may include, for instance, FSK modulation. The memory 82 can store firmware for generating the advanced media feature signal and for performing other functions.

The processor 78 may make decisions as to the type of media or instruction that is transmitted with the ring signal. Decision making for sending data and instructions to CPE device 42 may be performed at the eMTA 62. For example, the eMTA 62 may include a database stored in data storage that includes caller ID data linked to certain media, such as a ringtone, video clip, picture, audio clip, or the like. A particular incoming telephone number may be linked to certain media in the database, and the eMTA 62 sends instructions to the CPE device 42 to play the media identified for the incoming telephone number. An incoming caller ID instruction can indicate a particular media clip, so if the CPE device 42 already has the media clip stored, it will play the particular media clip. The database can be configured by the local user, so certain incoming calls get mapped to their configuration and media. Each telephone or telephone handset may be configured differently for different users in the house.

Figure 8:
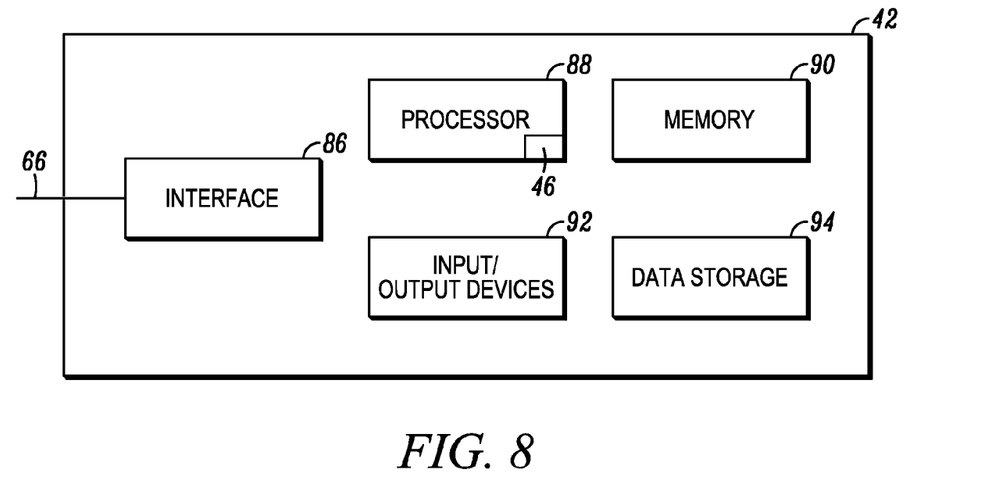
FIG. 8 is a block diagram showing the architecture of a CPE telephone device according to an embodiment.

FIG. 8 illustrates a block diagram of the CPE device 42 configured to process an advanced media feature signal. The CPE device 42 may include an interface 86, a processor 88, a memory 90, and input/output (I/O) devices 92. The CPE device 42 may include other features as is known in the art, such a microphones, speakers, keypads, display screens, and the like. The interface 86 may include an RJ-11 interface connecting the CPE device 42 to the loop 66. The processor 88 is operable to decode and process an advanced media feature signal and cause the advanced media feature to be performed in accordance with the signal. The processor 88 can be the demodulator 46, include an internal demodulator 46, or can communicate with an external demodulator 46. For example, a received media signal may be demodulated and instruct the processor to generate a customized ring tone. The ring tone is generated on the I/O devices 92 which may include the speaker 50, display screen 70, audio player 48, or the like. The memory 90 may store software executed by the processor. A data storage unit 94 in the CPE device 42 may store ring tones, pictures, video clips or other multimedia for playing on the I/O devices 92. The processor 88 may provide a multimedia output via one or more I/O devices 92 in response to an incoming call. A multimedia output may include a picture or some other form of media and a ring tone.

One or more of the steps or components described above may be implemented as software embedded or stored on a computer readable medium. The steps may be embodied by a computer program, which may exist in a variety of forms both active and inactive. For example, they may exist as software programs comprised of program instructions in source code, object code, executable code or other formats for performing some of the steps when executed. Modules may include software, such as programs, subroutines, objects, or the like. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. It is therefore to be understood that those functions enumerated herein may be performed by any electronic device capable of executing the above-described functions.

While embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

We claim:

1. A customer premises equipment (CPE) device connected to a local communications line existing within a customer premises and capable of receiving incoming telephone calls, comprising:
   an interface connecting the CPE device to the local line on the customer premises and enabling the CPE device to receive an alternating voltage analog ring signal corresponding to notification of an incoming call;
   a demodulator for decoding and processing the ring signal including additional media data which is of low amplitude relative to the alternating voltage analog ring signal and which is modulated on the alternating voltage analog ring signal; and
   an input/output (I/O) device providing audible or visual output of media from the CPE device corresponding to the additional media data modulated on the ring signal.

2. The CPE device according to claim 1, wherein the I/O device includes an audio player and a speaker and wherein the additional media data decoded and processed by the demodulator provides a customized ring tone or audio clip to said audio player and speaker for being emitted by said speaker to provide an audible notification of the incoming call.

3. The CPE device according to claim 1, wherein the I/O device includes a display screen and wherein the additional media data decoded and processed by the demodulator provides a graphic image or video stream to be displayed on said display screen to provide a visual notification concerning the incoming call.

4. The CPE device according to claim 1, wherein the local line comprises tip and ring twisted pair RJ-11 wiring, wherein said interface connects the CPE device to the RJ-11 wiring, and wherein the alternating voltage analog ring signal with additional low amplitude media data modulated thereon is received by the CPE device via the RJ-11 wiring.

5. The CPE device according to claim 1, wherein the demodulator is capable of receiving, decoding and processing the additional media data continuously during ring "on" and "off" periods of the CPE device.

6. The CPE device according to claim 1, wherein the demodulator of the CPE device is a Frequency Shift Key (FSK) demodulator and wherein the alternating voltage analog ring signal complies with conventional analog ring signal transmission requirements enabling a legacy CPE telephone without a demodulator to operate properly upon receipt of the alternating voltage analog ring signal and ignore the low amplitude media data as an acceptable amount of noise.

7. A customer premises equipment (CPE) telephone system capable of receiving incoming telephone calls via an outside service provider network, comprising:
   a customer premises equipment (CPE) network-interface device connected to the outside service provider network and having a processor detecting an incoming call and generating media data corresponding to the incoming call and a digital signal processing (DSP) circuit using an analog modulation technique to modulate the media data of a low amplitude on an alternating voltage analog ring signal of a greater amplitude;
   customer premises wiring comprising tip and ring twisted pair RJ-11 wiring connected to said CPE network-interface device;
   a customer premises equipment (CPE) telephone device connected to said RJ-11 wiring via which said CPE telephone device receives the ring signal having media data modulated thereon, said CPE telephone device having a demodulator for decoding and processing the low amplitude media data modulated on the ring signal, and said CPE telephone device having an input/output (I/O) device providing audible or visual output of media based on information provided by the media data decoded by said demodulator.

8. The CPE telephone system according to claim 7, wherein the I/O device includes an audio player and a speaker and wherein the media data decoded and processed by said demodulator provides a customized ring tone or audio clip to said audio player and speaker for being emitted by said speaker to provide an audible notification of the incoming call.

9. The CPE telephone system according to claim 7, wherein the I/O device includes a display screen and wherein the media data decoded and processed by said demodulator provides a graphic image or streaming video to be displayed on said display screen to provide a visual notification concerning the incoming call.

10. The CPE telephone system according to claim 7, wherein said demodulator continuously decodes and processes signals from said CPE network-interface device during ring "on" and "off" periods of the CPE telephone device for the incoming call.

11. The CPE telephone system according to claim 7, wherein said demodulator is a Frequency Shift Key (FSK) demodulator.

12. The CPE telephone system according to claim 7, wherein said alternating voltage analog ring signal complies with conventional analog ring signal transmission requirements and enables a legacy CPE telephone device without a demodulator to operate properly upon receipt of the alternating voltage analog ring signal and to ignore the low amplitude media data modulated on the ring signal as an acceptable amount of noise.

13. The CPE telephone system according to claim 12, further comprising a legacy CPE telephone device without a demodulator connected to said RJ-11 wiring.

14. The CPE telephone system according to claim 7, wherein said CPE network-interface device is a media terminal adapter (MTA) or an embedded media terminal adapter (eMTA) and the outside service provider network provides the MTA or eMTA with Voice-over-Internet-Protocol (VoIP) telephone service.

15. A method for providing additional media features and functionality to a customer premises equipment (CPE) telephone device connected via RJ-11 twisted pair wiring to a customer premises equipment (CPE) network-interface device which is connected to an outside service provider network, comprising the steps of:
  receiving an incoming call on the CPE network-interface device via the outside service provider network and generating and transmitting on the RJ-11 twisted pair wiring an alternating voltage analog ring signal having media data modulated thereon by said CPE network-interface device;
  decoding the ring signal with media data modulated thereon with a demodulator of the CPE telephone device; and
  providing audible or visual output of media via an input/output (I/O) device of the CPE telephone device based on information provided by the media data decoded by the demodulator.

16. A method according to claim 15, wherein said step of providing audible or visual output of media includes emitting a customized ring tone or audio clip from the CPE telephone device via an audio player and speaker of the CPE telephone device based on information provided by the media data decoded by the demodulator.

17. A method according to claim 15, wherein said step of providing audible or visual output of media includes displaying a graphic image or video on a display screen of the CPE telephone device based on information provided by the media data.

18. A method according to claim 15, wherein said media data is transmitted from said CPE network-interface device and is received and processed by said CPE telephone device continuously during ring "on" and "off" periods of the CPE telephone device for the incoming call and is uninterrupted by the ring "on" periods.

19. A method according to claim 15, wherein the alternating voltage analog ring signal complies with conventional analog ring signal transmission requirements and is of an amplitude that is greater than the relatively low amplitude of the media data modulated on the ring signal to enable a legacy CPE telephone device without a demodulator to operate properly upon receipt of the alternating voltage analog ring signal and to ignore the low amplitude media data modulated on the ring signal as an acceptable amount of noise on the ring signal.

20. A method according to claim 15, wherein said CPE network-interface device is a media terminal adapter (MTA) or an embedded media terminal adapter (eMTA) and the outside service provider network provides the MTA or eMTA with Voice-over-Internet-Protocol (VoIP) digital communication service.

* * * * *